Patented Jan. 26, 1932

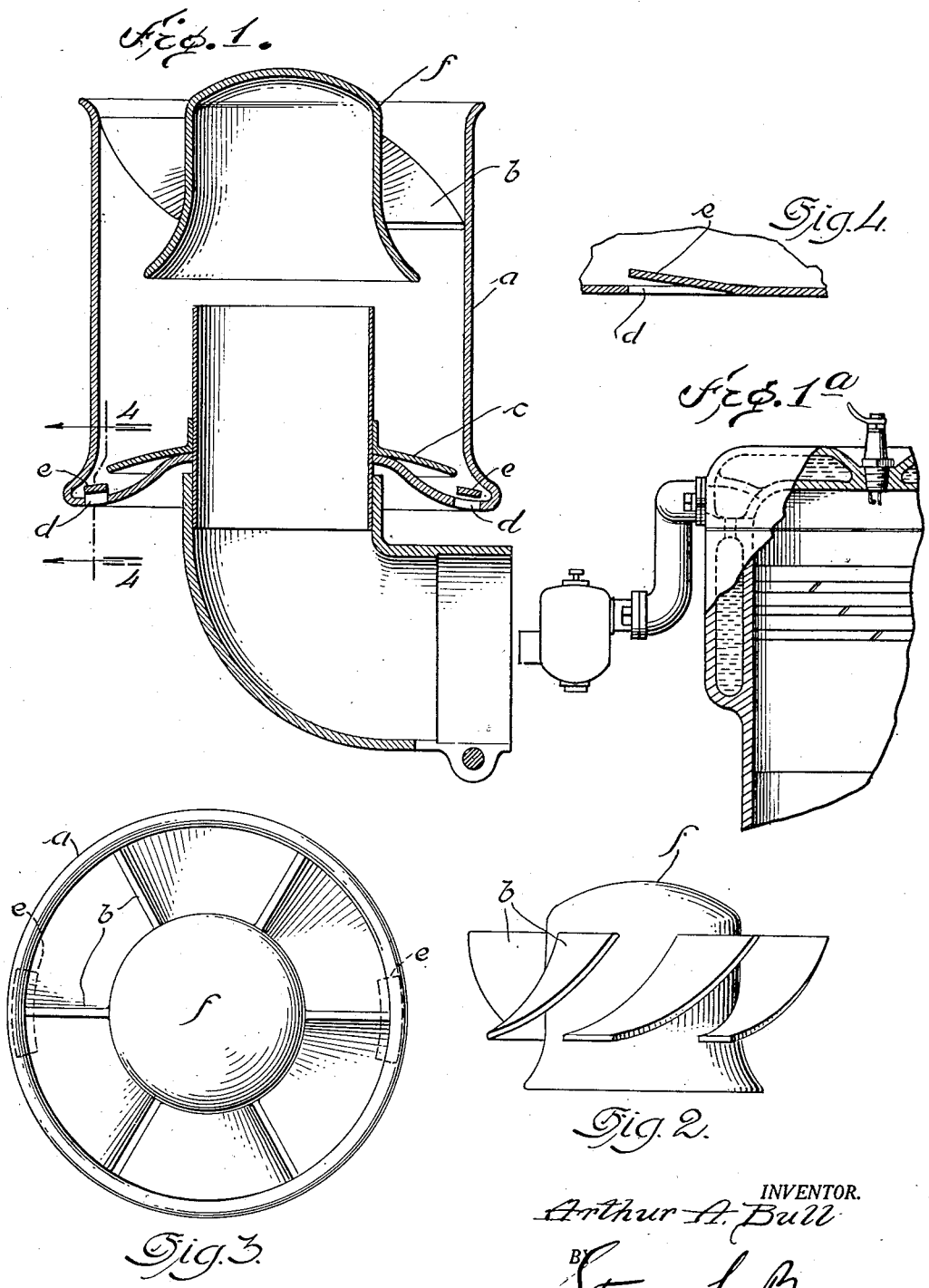

1,843,091

UNITED STATES PATENT OFFICE

ARTHUR A. BULL, OF DETROIT, MICHIGAN

AIR CLEANER

Application filed April 30, 1925. Serial No. 26,860.

This invention relates to air cleaners. It is the object of the invention to afford a simple and cheap air cleaner which is very effective to purify the air by removing dust and other suspended matter. The invention is intended primarily as an air cleaner to eliminate dust and grit from passing into the carburetor and thence into the engine-cylinders.

The present invention is an improved construction in which a suspended dome and a standpipe are used to require the air to turn twice before it passes into the carburetor. This has two purposes,—one to add another turning movement and thereby more thoroughly assure the elimination of all suspended matter, and secondly to interpose a standpipe through the center of the cleaner to prevent the dust and suspended matter thrown out in a centrifugal action, from rising at the center of the cleaner and being drawn into the suction pipe. These and other features will be more thoroughly described in the specification following.

In the drawings:

Fig. 1 is a vertical showing of an air cleaner which can be connected up with the carburetor of an internal combustion engine, and showing in Fig. 1—a the carburetor and engine on a reduced scale.

Fig. 2 is an elevation of the cast vane unit.

Fig. 3 is a plan view of the cleaner.

Fig. 4 is a section on the line 4—4 of Fig. 1.

$a$ is preferably a drawn shell or may be a casting. A vane unit, preferably a die casting, has a plurality of vanes $b$. This unit is pressed into the upper end of the shell. The vanes give the air entering a swirling action and cause the air to swirl around on the inside of the wall of the shell. This swirling action throws out the heavy particles by centrifugal force. They drop by gravity, and are also forced down by the incoming current which builds up a relatively small pressure, but nevertheless a positive pressure that is calculated to facilitate the dropping of the suspended particles by gravity. This forces the suspended matter down to the bottom corner of the shell below the hood $c$, which is interposed to prevent the accumulating dust from rising back up as it is caught in the trap in the bottom. Discharge ports $d$ are provided, and have inclined baffles $e$ interposed in the direction of the centrifugal air stream for the purpose of intercepting and directing the suspended matter out through the ports at the bottom.

An air cleaner of the above general construction is shown in my prior application Serial No. 729,866, filed August 4, 1924, which application disclosed in part the subject matter of this application.

In my improved structure I interpose in the center of the shell a standpipe. This standpipe therefore has a physical action in restraining the detachment of any of the suspended matter in a centrifugal current. To that extent the same is a considerable aid in confining all the suspended matter to the centrifugal action and cause it to be forced down into the trap at the bottom and finally discharged by gravity and the slight accumulated air pressure.

Furthermore, this standpipe presents still a further barrier in the path of suspended matter entering the suction pipe. By interposing the dome $f$ at the top of the shell, and having this suspended over and extending beyond the mouth of the standpipe, but slightly spaced therefrom, the air current in being drawn into the carburetor is caused to make a second turn in the cleaner. Every turn that the air is constrained to make facilitates the separating action, as all suspended matter tends to separate by the inertia action, wherever the air column is caused to make a sharp turn. It will be noted that the bottom flange or rim of the dome considerably extends beyond the diameter of the opening of the mouth of the suction pipe and causes the suspended matter, if any, to drop before it can be drawn over the rim of the standpipe into the suction line.

I have shown my air cleaner operating in a vertical position. This is the most advantageous position for the device to function in, but measurably good results can be accomplished by turning the device so that its axis lies to the horizontal. In a vertical position the device is not only better situated to perform its normal function, but it also lends itself nicely to the attachment to the so-called stoves that are used on automobile engines for pre-heating air intended for the carburetor.

The standpipe and hood are preferably drawn metal parts, and may be spot-welded or soldered to the body of the shell.

The principle of operation of my air cleaner involves the formation of an air helix in which the velocity of the air following the helical path is maintained relatively high without materially restricting the air current which would injuriously affect the engine operation at high speeds. The dust discharge port is located at or in the vicinity of the end of the cleaner casing, opposite the vanes. The dust separation takes place by the centrifugal action resulting from the helix or whirl of air, and also from the reversing action in directing the flow. The inertia of the helical air current serves to build up an end thrust at the dust discharge opening, which counteracts the incoming pressure so as to either so greatly reduce this or actually overcome it as to permit the separated matter, such as the dust, to be discharged directly to the atmosphere, the discharge being effected either by reason of the inertia of the swirling dust, or else at times by an actual countervailing pressure on the inside of the cleaner, even when the only source of pressure is the sucton of the engine and the atmospheric pressure. In order to make this helical column of air efficacious in producing end thrust it is necessary that the velocity of the air be not greatly reduced. Consequently in my air cleaner it will be seen that the passageways at or adjacent the end of the dome f do not greatly exceed, if they do exceed, the cross-sectional area of the air outlet tube or standpipe. This is very important for it results in the utilization of maximum air velocity in the helix without material restriction. This distinguishes my air cleaner from the devices of the prior art, such as the Weck Patent 548,490, of October 22, 1895, wherein the cross-sectional area of the air helix at or adjacent the discharge end of the vanes is several times the cross-sectional area of the air outlet. I therefore disclaim such a structure as shown in the Weck patent, and confine such claims where these limitations are introduced to an air cleaner in which the cross-sectional area of the air helix at or adjacent the discharge end of the vanes does not greatly exceed the cross-sectional area of the outlet pipe. By this I mean that there is no such multiplication of the cross-sectional area as shown in the Weck patent, so as to greatly reduce the air velocity and thereby make ineffective any thrust of the air helix where the operation is solely by suction.

It will be noted from the drawings and the pitch of the vanes that there is considerable inclination of the vanes from the axial line. This is, roughly, 45°, if a straight line were drawn from the upper edge of the vane to the lower edge, but these vanes are somewhat curved and near the lower edge the vanes are very much more inclined to the vertical, roughly approximating 60° from the axial line. The exact inclination is not essential, but it is highly desirable and effective to give a considerable inclination to the vane so that if continued in a helix they would make substantially one or more revolutions before they reach the dust outlet end of the casing. This gives a whirling stream which is much more effective to generate a countervailing pressure on the closed end as counterdistinguished to a stream which has very little inclination to the axial line. In other words, for a given velocity such a stream has much greater mechanical advantage than one of very much less inclination, according to the well known advantages of a screw of a small pitch. At the same time it is desirable to have the vanes with a considerable open space in the chamber below the outlet pipe entrance for the purpose of permitting the reversal of the air currents and hence the separation of the suspended matter both by gravity and by centrifugal force due to the helix of air. These features are very desirable in effectively separating dust and discharging it directly to the atmosphere in a cleaner which can depend only on the suction of the engine for whatever air blast it has.

The dust discharge slot or passageway is formed by the struck in baffle e, which leaves the final dust outlet port d. However, the dust discharge slot, or the dust outlet passage, or by what other name it may be designated, is really that space below the baffle e, together with the final dust outlet port d. This baffle e is slightly offset from the wall from which it is struck and the free edge of this baffle, together with the edge of the final outlet port, forms an opening which faces in a direction substantially reverse to the direction in which the swirling air current is traveling at this point. It also lies across the air stream at this point. It is therefore calculated to intercept the air stream and skim the dust particles out of the air stream and they are thus enabled to discharge by their own inertia, even in the face of a slight differential of pressure on the outside of this outlet. The effective mouth or opening of this dust discharge passage is defined in the claims in various ways, facing in a tangential line, or facing substantially reverse to the direction of travel of the swirling air stream, or arranged to have a wall cutting directly into the air stream. These are all intended to define this arrangement of the opening into the discharge passage, which serves to intercept the swirling dust to facilitate its discharge directly to the atmosphere.

What I claim is:

1. In an air cleaner, the combination of a shell provided at one end with an entrance for the incoming air and having stationary centrifugally acting means longitudinally inclined in the direction of the axis at such end for bending the incoming air current and directing it into a swirl and having at the opposite end of the shell a closure with one or more relatively restricted outlet ports normally open for the discharge of the suspended matter by means of the pressure built up by the swirling action, the said shell provided also at this last mentioned end with suction means and means within the shell for bending the air away from said discharge port or ports and then bending the same in a direction toward said port or ports as the air is drawn into the suction outlet.

2. In an air cleaner, a shell adapted to be vertically or horizontally positioned and provided at one end with a closure having one or more discharge ports, the opposite end of the shell being open and provided with centrifugally acting stationary means longitudinally inclined in the direction of the axis for permitting the entry of the air and for simultaneously giving the same an axially swirling action, and one or more baffles located adjacent the discharge ports for intercepting the swirling air and suspended matter, and directing the same out of the ports and into the atmosphere.

3. In an air cleaner, the combination of a shell provided with an end inclined upwardly at the center and provided with one or more discharge ports along the outside of the said end and further provided with a hood secured to the bottom near the center, suction means, and means at the end of the shell for giving the incoming air a swirling action.

4. An air cleaner of the type designed to separate dust particles by centrifugal action, comprising a shell with a closed end having an outlet provided with suction means and provided also with a restricted outlet to the atmosphere, and a hood positioned adjacent the closed end of said shell and extending from the center to a position adjacent the walls of the shell so as to be between said restricted outlet and the suction connection, said hood serving for entrapping the dust particles separated from the air.

5. An air cleaner comprising as a unit, an outer shell having an open end and a substantially closed end, provided with a restricted dust outlet to the atmosphere, a conduit positioned centrally of said closed end and extending into said shell and provided with suction means, a stationary dome positioned in said open end in axial alignment with said conduit and terminating adjacent the upper end of said conduit, and stationary vanes positioned between said dome and shell and acting in combination with said dome for giving the incoming air a swirling motion axially and outwardly in a spiral path past the upper end of said conduit and toward the periphery of the closed end of said shell, and a dust trap surrounding said conduit and extending outwardly adjacent the walls of the shell for entrapping the dust particles separated from the downwardly and outwardly directed air current.

6. An air cleaner of the type designed to separate dust particles by centrifugal action, comprising a shell with a closed end and a conduit positioned centrally of said closed end and extending inwardly into said shell and provided with suction means, and an annular baffle extending outwardly and axially towards the closed end of said shell for forming a chamber for receiving and entrapping the dust particles directed thereto by the centrifugal action of the air.

7. An air cleaner comprising a cylindrical shell having an open end and a closed end, a conduit positioned centrally of said closed end and extending inwardly into said shell, and provided with suction means, a dome positioned at the said open end having walls substantially parallel with the walls of the shell, the extremities of said walls of said dome terminating adjacent the upper end of the conduit and being outwardly flared to direct the incoming air axially past the conduit opening, and means positioned in the space between the dome and shell walls for directing the incoming air axially and outwardly with a swirling action for separating the dust particles therefrom.

8. An air cleaner, having in combination, a shell having an air opening at one end and closed at the opposite end except for one or more openings to the atmosphere of very limited size, centrifugally acting means longitudinally inclined in the direction of the axis and positioned near the opening for giving the incoming air a swirling motion by simply guiding it into a spiral path, thereby separating the dust and tending to expel the separated dust through such small opening, said shell provided with an air outlet having suction means in connection therewith, and a hood between the restricted dust outlet and said air outlet forming a dust trap to retain the collected dust until discharged by the pressure built up by the momentum of said swirling air.

9. In an air cleaner, the combination of a shell provided at one end with an entrance for the incoming air and having stationary centrifugally acting means longitudinally inclined in the direction of the axis at such end for bending the incoming air current and directing it into a swirl and having at the opposite end of the shell a relatively restricted outlet port normally open for the discharge of the suspended matter by means of the pressure built up by the swirling action, the said shell provided also with suction means and means within the shell for bending the air away from said discharge port and then bending the same in a direction toward said outlet port as the air is drawn into the suction outlet.

10. An air cleaner comprising a cylindrical shell having an open end and a closed end, a conduit positioned centrally of said shell and extending inwardly into said shell, and provided with suction means, a dome positioned at the said open end having walls substantially parallel with the walls of the shell, the extremities of said walls of said dome terminating adjacent the end of the conduit and being outwardly flared to direct the incoming air axially past the conduit opening, and means positioned in the space between the dome and shell walls for directing the incoming air axially and outwardly with a swirling action for separating the dust particles therefrom.

11. An air cleaner for use in combination with suction creating apparatus such as an internal combustion engine, etc., having in combination a casing having an air cleaning chamber, helically arranged stationary guiding vanes for bending and guiding the air to be cleaned, which air is taken into one end of said chamber, said guiding vanes forming said air into a helical stream by the pull of the suction apparatus and directing such helical stream toward the opposite end in a screw-like swirl, an outlet pipe connected with said chamber axially and arranged for reversing the flow of said air, said casing being closed against discharge of any substantial amount of separated matter to the atmosphere beyond the vanes save for a dust discharge passage or passages to the atmosphere located at or in the vicinity of the end opposite the entrance end, said dust passage being relatively small and arranged to have a wall cutting directly into the swirling air stream and being so proportioned and located that in conjunction with the thrust of the swirl of said helical stream it is adapted to discharge the dust directly to the outside atmosphere from the interior of the chamber when the pressure in portions of said chamber is sub-atmospheric and capable of effecting said discharge solely by the force generated in the air swirl by the suction pull.

12. An air cleaner for use in combination with suction creating apparatus such as internal combustion engines, etc., having in combination a casing having an air-cleaning chamber, longitudinally inclined stationary vanes at one end of the casing for forming the incoming air into a helix, an air outlet pipe connected with the chamber axially from one end and having its mouth located somewhat removed longitudinally from the end of the casing opposite the vanes, said outlet pipe arranged for reversing the air flow, said casing being closed against discharge of any substantial amount of separated matter to the atmosphere on the delivery side of the vanes save for a relatively small dust discharge slot or slots directly to the atmosphere located only at or in the vicinity of the end of the casing opposite the guiding vanes, the discharge slot having its effective mouth facing in an approximately tangential line and contrary to the direction of travel of the air stream and lying across the line of travel of the swirling air current at this point, said slot thereby arranged to intercept the swirling air current, the said guiding vanes forming passageways whose total cross-sectional area at their discharge end does not greatly exceed the cross-sectional area of the air outlet pipe, whereby the velocity of the screw-like air stream is not materially lowered and the thrust of such air stream coupled with a relatively small dust outlet port so located serves to counteract the outside atmospheric pressure at the dust outlet slot to permit discharge of separated dust or other matter directly to the atmosphere even when the only pressure-creating means is the suction through the air outlet.

13. The combination specified in claim 12, in which the inclination of the vanes describes helices which if continued would make substantially one or more complete turns before reaching the closed end of the casing.

14. The combination claimed in claim 11, in which the dust discharge passage is formed by a portion of the wall of the casing offset from its normal plane.

In testimony whereof I have affixed my signature.

ARTHUR A. BULL.